United States Patent [19]

Miller

[11] 4,372,862
[45] Feb. 8, 1983

[54] OIL-SOLUBLE METAL CONTAINING SULFONATED POLYMERS USEFUL AS OIL ADDITIVES

[75] Inventor: Harold N. Miller, Houston, Tex.

[73] Assignee: Exxon Research & Engineering Co., Florham Park, N.J.

[21] Appl. No.: 195,847

[22] Filed: Oct. 10, 1980

[51] Int. Cl.$^3$ .............. C10M 1/40; C10L 1/24
[52] U.S. Cl. ................ 252/33; 252/32.7 E; 252/35; 252/39; 252/51.5 A; 44/62; 44/68; 44/76
[58] Field of Search ............ 252/33, 32.7 E, 389 R; 44/62, 68, 76; 260/429.9

[56] References Cited

U.S. PATENT DOCUMENTS

| | | | |
|---|---|---|---|
| 2,367,468 | 1/1945 | Mixon et al. | 252/48 |
| 2,677,702 | 5/1954 | Bloch et al. | 200/513 |
| 2,883,340 | 4/1959 | Wasley et al. | 252/33 |
| 3,325,418 | 6/1967 | Stuart | 252/32.7 |
| 3,352,782 | 11/1967 | Brasch | 252/47.5 |
| 3,396,136 | 8/1968 | Dickerson | 260/30.6 |
| 3,679,382 | 7/1972 | Cohrs et al. | 44/7 D |
| 3,836,511 | 9/1974 | O'Farrell et al. | 260/73.3 R |
| 3,931,021 | 1/1976 | Lundberg | 252/32.5 |
| 3,941,834 | 3/1976 | Lee | 260/504 R |
| 3,950,401 | 4/1976 | Petrille et al. | 260/504 R |
| 4,086,171 | 4/1978 | Wood et al. | 252/33 |

FOREIGN PATENT DOCUMENTS

| | | |
|---|---|---|
| 2348 | 6/1979 | European Pat. Off. . |
| 1246545 | 2/1969 | United Kingdom . |
| 1239082 | 7/1971 | United Kingdom . |

Primary Examiner—Jacqueline V. Howard
Attorney, Agent, or Firm—Frank T. Johmann

[57] ABSTRACT

This invention relates to oil soluble, metal containing sulfonated polymers useful as additives for lubricating oils or hydrocarbon fuels and which are effective as dispersants. Such polymers of high molecular weight are also useful as viscosity-index improvers for the lubricating oils. The polymeric dispersant additives are ionic polymers which comprise a backbone substantially soluble in the fuel or lubricant, and pendant ionic groups which are sulfonic acid groups neutralized with a metal compound. Polymeric dispersant additives of this type may be made which are also capable of imparting excellent viscosity improvement, varnish inhibition, oxidation inhibition and detergency to the lubricant. These additives may also impart rust preventive properties to the oil or fuel, and as V.I. improvers they can be formed to have particularly good low temperature viscosity effects in lubricating oil.

23 Claims, No Drawings

OIL-SOLUBLE METAL CONTAINING SULFONATED POLYMERS USEFUL AS OIL ADDITIVES

BACKGROUND OF THE INVENTION

1. Field of the Invention

This invention relates to oil-soluble polymeric additives for fuel and lubricant; compositions, including concentrates, containing said additives and methods for their manufacture and use, wherein the polymeric additives are ionic polymers made by sulfonating an aliphatic hydrocarbon polyolefin polymer, which is neutralized with a metal compound. The polymeric additives are capable of imparting viscosity improvement, dispersancy, varnish inhibition, anti-rust and detergency properties.

Various polymers containing neutralized sulfonic acid groups are known in the additive art as follows.

U.S. Pat. No. 2,367,468 teaches metal, ammonia and amine salts of 500–3,000 molecular weight olefin copolymer reacted with chlorosulfonic acid to form a lubricant additive.

U.S. Pat. No. 2,677,702 forms a water-soluble sulfonated polymer wherein an olefin and a conjugated diene such as butadiene and isobutylene, are copolymerized and sulfonated to form polymers which can then be neutralized with metals, amines or alkanol amines, said polymers having molecular weights of about 1,000–6,000 and being useful in aqueous solutions and as emulsifiers.

U.S. Pat. No. 2,883,340 teaches V.I.-detergent additives for lubricating oil by sulfonating with $SO_3$ or chlorosulfonic acid, a polymer of low molecular weight olefin, e.g. $C_3$ to $C_6$ olefins such as isobutylene, or copolymers such as butadiene-isoprene, of 10,000 to 50,000 molecular weight and then forming a metal salt.

U.S. Pat. No. 3,325,418 teaches high molecular weight polychlorosulfonated polymers which can be reacted with amines and are useful as V.I. improvers and as detergents in lubricating oils.

U.S. Pat. No. 3,352,782 reacts polymers having about 30–250 carbons and about 400–3,000 Staudinger molecular weight, which may have single or multiple unsaturations, such as polyisobutylene, with a chlorosulfonic acid.

U.S. Pat. No. 3,396,136 forms metal salts of polymeric sulfonic acid which polymers are prepared by polymerizing various monomers with an alkenyl aromatic sulfonic acid monomer, or by directly sulfonating polymers containing sulfonable aromatic groups and forming metal salts, to form a V.I. improver for lubricating oil.

U.S. Pat. No. 3,679,382 teaches a hydrocarbon fuel thickened with a polymeric material such as styrene copolymerized with an acrylate such as a sulfonic methacrylate.

U.S. Pat. No. 3,836,511 teaches a process for sulfonation of high molecular weight rubbers such as copolymers of ethylene, propylene and diene monomers, with an acyl sulfate prepared by mixing an anhydric monobasic acid such as acetic anhydride with sulfuric acid. Column 13 teaches that these materials may be reacted with any amine. Example 10 indicates that an avantage of the acyl sulfate is that it can be used without degradation of the polymer. However, there is no teaching of use in lubricating oil of the products thereby formed.

U.S. Pat. No. 3,931,021 teaches high molecular weight polymers, such as those of ethylene and other olefins, which are sulfonated and neutralized with a metal compound, following which polar cosolvent is used. The cosolvent may be an alcohol or an amine in relatively large amounts, e.g. 10–600 moles per molecular portion of the sulfonic acid moiety. The resulting material is taught as useful in lubricating oil as a V.I. improver.

U.S. Pat. No. 3,941,834 teaches polymers of 300–200,000 molecular weight of $C_2$–$C_6$ unsaturated hydrocarbons which are reacted with chlorosulfonic acid and then reacted to form metal salts or amine compounds, with the amine compounds apparently reacting through the chlorine, which materials are useful multifunctional additives serving as V.I. improvers and detergents in lubricating oil.

U.S. Pat. No. 3,950,401 teaches sulfonation of low molecular weight polymers of 250–500 molecular weight prepared from propene or butene as lubricating oil anti-rust additives.

U.S. Pat. No. 4,086,171 teaches a block copolymer of a sulfonated monoalkenyl arene such as styrene, with an unsaturated olefin such as butadiene, said polymer being selectively hydrogenated and then sulfonated, and which can be reacted with ammonia or amines to form a V.I. detergent additive for lubricating oil.

U.K. Pat. No. 1,246,545 teaches dehydrohalogenating a chlorinated olefin polymer such as polyisobutylene of about 20 to 150 carbons, and then sulfonating and neutralizing with a metal base or amine to form a detergent additive for lubricating oil.

SUMMARY OF THE INVENTION

In contrast to the above patents, the present invention is directed to polymers which are oil soluble and not water soluble, which are sulfonated but without requiring the presence of chlorine, which are aliphatic and do not require aromatic groups in the polymer, which are reacted with metal compounds to form a multifunctional V.I. improver-dispersancy additive and do not require the use of a cosolvent, and which can provide a plurality of sulfonate groups on the polymer, and which contain ethylene.

The Neutralized Sulfonated Polymer

Useful additives include oil-soluble metal containing sulfonated polymers of $C_2$ to $C_{50}$, preferably $C_2$ to $C_{18}$ aliphatic olefins, said additives after sulfonation and neutralization having number average molecular weights ($\overline{M}n$) of about 5000 to 1,000,000; e.g. 10,000 to 500,000, e.g. 20,000 to 200,000 as determined by vapor phase osmometry, gel permeation chromatography, or more preferably by membrane osmometry, and containing about 0.007 to 6.00, preferably 0.02 to 2.80 wt. % metal, and about 0.03 to 1.92, preferably 0.06 to 1.00 wt. % sulfur. The aforesaid sulfur levels are equivalent to about 1 to 60, preferably about 2 to 31 millimoles of sulfonate ($SO_3$) groups per 100 grams of sulfonated polymer.

The Polymer

Sulfonatable, e.g. having at least one ethylenic unsaturation, hydrocarbon polymers of $C_2$ to $C_{50}$, e.g. $C_2$ to $C_{18}$ aliphatic olefins can be used. Particularly preferred for sulfonation are aliphatic terpolymers of ethylene and higher $C_3$ to $C_{18}$ α-olefins, and a $C_5$ to $C_{14}$ diolefin. These terpolymers will generally comprise about 30 to 84.5 mole % ethylene; about 15 to 69.5 mole % of one or more higher $C_3$ to $C_{18}$ olefin, and about 0.5 to 20 mole % of one or more of the diolefin. Preferred are polymers of 40 to 70 mole % ethylene, 20 to 58 mole % of the higher olefin and 2 to 10 mole % of diolefin. On a weight basis usually at least 2 wt. % of the terpolymer will be the diolefin and many commercially available polymers will contain about 3 to 5 wt. % diene. Mixtures of monoolefins and/or mixtures of diolefins can be used.

Examples of the above-noted higher $C_3$-$C_{18}$ alpha monoolefins include propylene, 1-butene, 1-pentene, 1-hexene, 1-heptene, 1-decene, 1-dodecene, 1-heptadecene, 4-methyl-1-pentene etc. Preferred are the $C_3$-$C_8$ monoolefins, particularly propylene.

Representative nonlimiting examples of the nonconjugated diolefins include:

A. Straight chain acyclic dienes such as: 1,4-hexadiene, 1,5-heptadiene, 1,6-octadiene.

B. Branched chain acyclic dienes such as: 5-methyl-1,4-hexadiene; 3,7-dimethyl 1,6-octadiene; 3,7-dimethyl 1,7-octadiene; and the mixed isomers of dihydromycrene and dihydroocimene.

C. Single ring alicyclic dienes such as: 1,4-cyclohexadiene; 1,5-cyclooctadiene; 1,5-cyclododecadiene; 4-vinylcyclohexene; 1-allyl-4-isopropylidenecyclohexane; 3-allylcyclopentene; 4-allyl-cyclohexene and 1-isopropenyl-4(4-butenyl) cyclohexane.

D. Multi-single ring alicyclic dienes such as: 4,4'-dicyclopentenyl and 4,4'-dicyclohexenyl dienes.

E. Multi-ring alicyclic fused and bridged ring dienes such as: tetrahydroindene; methyl tetrahydroindene; dicyclopentadiene; bicyclo(2.2.1)hepta 2.5-diene; alkenyl, alkylidene, cycloalkenyl and cycloalkylidene norbornenes such as: 5-methylene-2-norbornene; 5-ethylidene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene and 5-cyclohexylidene-2-norbornene.

In general, the preparation of copolymers or terpolymers suitable for the practice of this invention by means of Ziegler-Natta catalysts is known in the prior art; for example, see U.S. Pat. Nos. 2,933,480; 3,000,866; and 3,093,621. These polymers, which are primarily produced for use in elastomeric compositions, are usually characterized by the substantial absence of chain or backbone unsaturation while the nonconjugated dienes define sites of unsaturation in groups which are pendant to or are in cyclic structures outside the main polymer chain. Ethylene-propylene-nonconjugated diolefin (EPDM) terpolymers are known articles in commerce. Various examples of such commercially available copolymers or terpolymers ae VISTALON ®, as elastomeric copolymer of ethylene and propylene, or terpolymer of ethylene, propylene and 5-ethylidene-2-norbornene, marketed by Exxon Chemical Co., New York, N.Y. and NORDEL ®, a terpolymer of ethylene, propylene and 1,4-hexadiene, marketed by E. I. du Pont De Nemours & Co., Wilmington, Del.

These commercial polymers, which are usually high molecular weight elastomers, may be further modified by mastication, extrusion, milling, heating, etc., in order to break down their molecular weight to different grades optimum for various oil or fuel additive uses.

A typical EPDM (terpolymer of ethylene, propylene and a diene monomer) is VISTALON 2504 (Exxon Chemical Co.), a terpolymer having a Mooney viscosity (ML, 1+8, 212° F.) of about 40 and having an ethylene content of about 50 wt. % and a 5-ethylidene-2-norbornene content of about 5.0 wt. %. The $\overline{M}n$ of VISTALON 2504 is about 47,000, the $\overline{M}v$ is about 145,000 and the $\overline{M}w$ is about 174,000.

Another EPDM terpolymer VISTALON 2504-20 is derived from V-2504 (Exxon Chemical Co.) by a controlled extrusion process, wherein the resultant Mooney viscosity at 212° F. is about 20. The $\overline{M}n$ of VISTALON 2504-20 is about 26,000, the $\overline{M}v$ is about 90,000 and the $\overline{M}w$ is about 125,000.

NORDEL 1320 (DuPont) is another terpolymer having a Mooney viscosity at 212° F. of about 25 and having about 53 wt. % of ethylene, about 3.5 wt. % of 1,4-hexadiene and about 43.5 wt. % of propylene.

The preferred EPDM terpolymers of this invention have a number average molecular weight ($\overline{M}n$) of about 5000 to 500,000, usually about 10,000 to about 200,000, more preferably of about 15,000 to about 100,000, most preferably of about 20,000 to about 60,000. The Mooney viscosity (ML, 1+8, 212° F.) of the EPDM terpolymer is about 1 to 60, e.g. 2 to about 50, more preferably about 3 to about 40, and most preferably about 5 to about 40. The $\overline{M}v$ of the EPDM terpolymer is preferaly below about 350,000 and more preferably below about 300,000. The $\overline{M}w$ of the EPDM terpolymer is preferably below about 350,000.

The neutralized sulfonated elastomeric polymers of this present instant invention further include degraded or cracked ethylene-propylene copolymers or EPDM polymers.

While the invention is primarily directed to sulfonating an ethylene-containing hydrocarbon polymer and then at least partly neutralizing with a metal compound, which material is used in oil compositions, equivalent materials may be formed, in some instances, by direct synthesis of hydrocarbon monomers with sulfonate or neutralized sulfonate monomers, to give equivalent compositions, which are contemplated as being within the scope of the present invention.

Sulfonation

One means for carrying out the polymer sulfonation is to first dissolve the polymer in a substantially nonreactive solvent including mineral lubricating oils such as white oil, or even lubricating oils containing some aromatics such as solvent neutral oils e.g. Solvent 100 Neutral, Solvent 150 Neutral, etc., chlorinated aliphatic hydrocarbon, chlorinated aromatic hydrocarbon, aliphatic hydrocarbons, etc. Some specific examples include carbon tetrachloride, dichloroethane, chlorobenzene, cyclohexane, pentane, isopentane, hexane, isohexane or heptane, etc. A sulfonating agent is added to the solution of the elastomeric polymer and nonreactive solvent at a temperature of about −30° C. to about 100° C., over a period of time ranging from as quickly as possible, e.g. a few seconds to about 60 minutes, more usually at about room temperature for about 1 to about 45 minutes, e.g. about 1 to about 30 minutes. Typical sulfonating agents are described in U.S. Pat. Nos. 3,642,728 and 3,836,511, incorporated herein by reference. These sulfonating agents are preferably selected from an acyl sulfate, a mixture of sulfuric acid and an acid anhydride or a complex of a sulfur trioxide donor and a Lewis base containing oxygen, sulfur, or phosphorus. Typical sulfur trioxide donors are $SO_3$, sulfuric acid, oleum, etc. Typical Lewis bases are: dioxane, tetrahydrofuran, triethylphosphate, etc. The most preferred sulfonation agent for the invention is an acyl sulfate selected from the group consisting essentially of benzoyl, acetyl, propionyl or butyryl sulfate.

The reaction can be quenched with an aliphatic alcohol such as methanol, ethanol, isopropanol, with an aromatic hydroxyl compound, such as phenol, a cycloaliphatic alcohol such as a cyclohexanol or with water. The acid form of the sulfonated polymer will generally have about 1 to about 60 meq. (milliequivalents) $SO_3H$ groups per 100 grams of sulfonated polymer, more preferably about 1 to about 50; and most preferably about 2 to about 31. The meq. of $SO_3H$/100 grams of polymer is determined by both titration of the polymeric sulfonic acid and Dietert Sulfur analysis. In the titration of the sulfonic acid the polymer can be dissolved in a solvent consisting of 95 parts of toluene and 5 parts of methanol at a concentration level of 50 grams per liter of solvent. The acid form can then be titrated with ethanolic sodium hydroxide to an Alizarin Thymolphthalein endpoint.

The resulting sulfonated polymer, preferably in solution, e.g. in the aforesaid solvent used to carry out the sulfonation such as mineral lubricating oil, can be readily reacted with the metal compounds by mixing together at $-30$ to 100, preferably 0° to 60° C., for from 10 minutes to 30 hours, preferably 10 minutes to 10 hours, usually about 15 minutes to about 3 hours. For large scale use, it is particularly preferred to form a solution of the starting polymer in solvent (preferably a mineral lubricating oil), then sulfonate the polymer and then neutralize, to thereby form a concentrate of the final neutralized sulfonated polymer while avoiding the need to strip off the solvent.

The Metal Neutralization

The neutralizing agents of the present invention include the metal hydroxides, metal carbonates, metal alkoxides having about 1 to about 8 carbon atoms or metallic salts of $C_1$ to $C_{18}$ carboxylic acids, wherein the metal is selected from the group including iron, aluminum, antimony, lead and Groups I-A, II-A, I-B and IIB of the Periodic Table of Elements and mixtures thereof. Alkali metals and alkaline earth metals are preferred. The neutralization agents, which can be dissolved in water or alcohols or mixtures thereof, are added to the cement of the sulfonated elastomeric polymer thereby neutralizing the sulfonate groups.

Useful examples of metal hydroxides are NaOH, KOH, LiOH, $Mg(OH)_2$ and $Ba(OH)_2$. Useful carbonates are the alkali metal carbonates. The carboxylate ion of the metallic salt of the carboxylic acid can be derived from the carboxylic acids including fatty and aromatic acids such as acetic, benzoic, lauric, palmitic, myristic, decanoic, octanoic, and stearic, etc.

Preferably, neutralization of some or all, such as 25% or more of the acid groups of the acid form of the sulfonated polymer is carried out by the addition of a solution of metal acetate to the acid form of the sulfonated polymer which is dissolved in the mixture of aliphatic alcohol and non-reactive solvent. The metal acetate is preferably dissolved in water and/or an aliphatic alcohol or solvent. Typically, but non-limiting metal acetates are sodium acetate, barium acetate, magnesium acetate, aluminum acetate, potassium acetate, lead acetate, and zinc acetate, etc.

Sufficient neutralizing agent is added to the solution of the acid form of the elastomeric polymer to effect neutralization of the $SO_3H$ groups. It is preferable to neutralize at least 50%, e.g. 95% of the acid groups, more preferably about 98%, most preferably 100%. While it is preferred to neutralize the acid form of the sulfonated polymer before its use in lubricating oil compositions, actually partial or complete neutralization can be carried out in situ in the lubricant. Thus, many lubricating oil compositions contain metal componds, e.g. metal salts, such as overbased metal alkylaryl sulfonates or alkyl phenate sulfides. These overbased materials are generally colloidal dispersions of metal carbonates formed by blowing $CO_2$ through an oil dispersion of metal base, such as lime, MgO, etc., suspended in the oil with a surfactant such as metal alkylaryl sulfonate, etc. If the acid form of the sulfonated polymer is added to a lubricant containing metal compound, particularly basic metal compounds such as metal carbonates present in overbased sulfonates, then the sulfonic acid groups of the polymer will tend to form the sulfonate metal salts in situ from these other metal-containing additive materials. Thus, metal neutralized sulfonate polymers as defined and claimed herein, include both those which are preneutralized before mixed with other lubricant additives as well as those where the metal neutralization takes place in situ by reaction of the sulfonic acid groups of the polymer with other metal containing additives.

The Compositions

The reaction products of this invention can be incorporated in lubricating oil compositions, e.g., automotive crankcase lubricating oils, in concentrations within the range of about 0.01 to 10 weight percent, e.g. 0.1 to 7 weight percent, preferably 0.2 to 5.0 weight percent, based on the weight of the total composition. The lubricants to which the products of this invention can be added include not only hydrocarbon oils derived from petroleum but also include synthetic oils such as alkyl esters of dicarboxylic acids, polyglycols and alcohols; polyalphaolefins, alkyl benzenes, organic esters of phosphoric acids, polysilicone oil, etc.

When the products of this invention are used, for example as dispersants, in normally liquid petroleum fuels such as gasoline, and middle distillates boiling from about 150° to 800° F., including kerosene, diesel fuels, home heating fuel oil, jet fuels, etc., a concentration of the additive in the fuel in the range of 0.001 to 0.5, preferably about 0.001 to 0.1 weight percent, based on the weight of the total composition, will usually be employed.

The additive may be conveniently dispensed as a concentrate comprising a minor proportion of the additive, e.g. 5 to 45 wt. %, dissolved in a major proportion of a mineral lubricating oil, e.g., 95 to 55 wt. %, with or without other additives being present.

In the above compositions or concentrates, other conventional additives may also be present, including dyes, pour point depressants, antiwear agents such as tricresyl phosphate or zinc dialkyl dithiophosphates of 3 to 8 carbon atoms in each alkyl group, antioxidants such as N-phenyl α-naphthylamine, t.-octyl phenol sulfide, 4,4'-methylene bis(2,6-di-tertbutyl phenol), other viscosity index improvers such as ethylene-propylene copolymers, polymethacrylates, polyisobutylene, alkyl fumarate-vinyl acetate copolymers and the like, as well as other ashless dispersants such as the polyisobutylene succinic anhydride reacted with amines, hydroxy amines, polyols, etc., metal detergents such as carbon dioxide overbased metal alkylaryl sulfonates which also may serve as anti-rust agents, etc.

Forming The Oil Compositions

The sulfonate products, in general, are difficult to dissolve in oil, and may require long dissolving periods, elevated temperature, vigorous agitation, etc. Preparing concentrates is usually even more difficult. It has been found that using other oil additives may facilitate dissolving the neutralized sulfonated polymers into mineral oil. For example, adding the polymers to lubricating oil, along with 0.2 to 6 parts by weight, preferably 0.5 to 3 parts by weight of said other additive, per part by weight of the neutralized sulfonated polymer, may materially decrease the dissolving time. The addition of these amounts of the other additives may also be useful in reducing the viscosity of the composition. This is particularly useful when making concentrates and additive packages as larger amounts of sulfonated product can be incorporated into the oil without making the concentrate unduly viscous so as to interfere with ease of handling or subsequent blending.

Oil soluble alkyl hydroxy aromatic sulfides, such as alkyl phenol sulfides, which are conventional lubricating oil antioxidants, may be used as a dissolving aid to facilitate oil solubilization of the metal derivatized sulfonated polymer. These sulfides are generally formed by reacting alkylated phenolic or polyhydroxy aromatics having 1 to 3 OH groups, e.g. alkyl phenol or dihydroxy benzene (e.g. resorcinol), etc., with 1 to 3 alkyl groups of about 2 to 20, usually 8 to 12 carbons each, with sulfur or sulfur halides e.g., sulfur mono or dichlorides. Other materials that can be used to facilitate dissolving the sulfonates are lubricating oil ashless sludge dispersants, such as those formed by reacting long chain (usually $C_2$ to $C_5$ olefin polymers) substituted succinic anhydride or acid, e.g. polyisobutenyl succinic anhydride, wherein the polyolefin substituent group, e.g. polyisobutenyl group, is about 50 to 400 carbons, with amines or hydroxy amines, with 2 to 60 carbons and 1 to 12 nitrogens, or with $C_1$ to $C_{40}$, e.g. $C_2$ to $C_{20}$ alcohols, including polyols with 2 to 10 hydroxy groups. Such dispersants are preferably made by reacting polyethylenepolyamines, e.g. tetraethylenepentamine, tris hydroxymethylaminomethane (THAM); pentaerythritol, etc. with the polyisobutenyl succinic anhydride and are usually available in the form of concentrates of about 40 to 60 wt. % in mineral oil. Since the phenol sulfide antioxidant, and particularly the ashless dispersants may be used in forming the finished lubricant, by preblending them with the sulfonate they can be made to also facilitate the solvation of the sulfonate and to form additive concentrates or a finished lubricant. Thus, it may be advantageous to first blend into the oil the phenol sulfide and/or ashless dispersant before blending in the sulfonate polymer.

A method of preparing these oil compositions, e.g. lubricating oil concentrates is by using 0.1 to 20, preferably 0.2 to 6, more preferably 0.5 to 3 parts by weight of the dissolving aid, such as the phenol sulfide, or ashless dispersant, per part by weight of the metal sulfonated polymer in the mineral oil, e.g., lubricating oil, at temperature ranging from ambient (e.g. 25° C.) up to about 200° C. and preferably up to about 10° C. below the boiling point of the cosolvent. A smooth, homogeneous gel-like fluid or gel-like semi-solid additive blend can be obtained which becomes fluid on heating. This concentrate, in turn, can be further dissolved with added lubricating or fuel oil to form finished formulations at ambient or slightly elevated temperatures.

This invention will be further understood by reference to the following examples, which include preferred embodiments of the invention.

EXAMPLE 1

Part A—Sulfonation 500 grams of V-2504 (which had been masticated in the presence of air to a Mooney viscosity at 212° F. of about 20.5 were dissolved by stirring overnight in 5000 ml of hexane under a nitrogen blanket in a reactor. The reactor used in these Examples was a flask equipped with a stirring rod driven by an electric motor, a thermometer, a condensor, a dropping funnel, and a nitrogen inlet so as to maintain a nitrogen atmosphere during the preparation. The flask had a heating mantle, which was removable, e.g. when it was desired to cool the flask in an ice bath. V-2504 is a terpolymer of about 50 wt. % ethylene, about 44.2 wt % propylene and about 5.8 wt. % of 5-ethylidene-2-norborene, having an unsaturation of about 47.5 meg./100 grams. 24.58 grams of an acetyl sulfate containing solution (sufficient to sulfonate the polymer to about 18.3 millimole/100 g) dissolved in 105 ml of 1,2-dichloroethane were added dropwise to the reactor over a period of about 45 minutes with vigorous stirring. The acetyl sulfate was made up at 0° C. in an ice bath, while protected from moisture, by adding 10.32 grams of 95% sulfuric acid to 16.54 grams of acetic anhydride and mixing. The acetyl sulfate was then dissolved in the 1,2-dichloroethane. After the acetyl sulfate solution in the 1,2-dichloroethane was added, the mixture was stirred for an additional hour and then 430 ml of isopropyl alcohol were added to deactivate the reaction and stirred for about 10 minutes. The batch was then split into two parts of 2080 grams each which were further treated as follows:

Part B—Neutralization with Magnesium Acetate 11.77 grams of hydrated magnesium acetate, Mg$(C_2H_3O_2)_2 \cdot 4H_2O$, dissolved in 75 ml water, equivalent to 18.3 millimoles per 100 g. of polymer were added to a 2088 gram portion of the aforesaid sulfonated polymer solution, followed by mixing vigorously for one hour. One gram of American Cyanamid 2246 antioxidant was next mixed into the reaction mixture for 10 minutes. The reaction mixture was then steam stripped to remove solvent, washed three times with distilled water, filtered, and dried in a vacuum oven at 50° C. for one hour, overnight at ambient temperature and then for 24 hours at 75° C. 157 grams of dried product was obtained which analyzed 82.86 wt. % carbon, 13.59 wt. % hydrogen, 0.50 wt. % sulfur and 0.53 wt. % magnesium.

Part C—Neutralization with Sodium Acetate 9.01 grams of sodium acetate Na$C_2H_3O_2$ in 75 ml of distilled water was added to 2080 grams of aforesaid sulfonated polymer solution following by vigorously stirring for one hour. One gram of said 2246 antioxidant was mixed in for 10 minutes followed by finishing as noted above with Part B, i.e. steam stripping, washing, filtering and drying.

213 grams of dried product was obtained which analyzed 83.40 wt. % carbon, 13.44 wt. % hydrogen, 0.54 wt. % sulfur and 0.66 wt. % sodium.

EXAMPLE 2

250.0 grams of masticated V-2504 (same as in Example 1) were dissolved in 5000 ml of hexane in the reactor, as described above. 14.78 grams of acetyl sulfate, sufficient to sulfonate the polymer to about 22.0 millimole/100 g polymer, made as described in Example 1 and dissolved in 50 ml 1,2-dichloroethane were added to the reactor over a period of about 50 minutes while vigorously stirring. The mixture was then stirred for an additional hour. 230 ml of isopropyl alcohol was added to deactivate the reaction mixture and stirred for 15 minutes. 11.80 grams of magnesium acetate tetrahydrate $(CH_3COO)_2Mg.4H_2O$ dissolved in 75 ml of distilled water was added followed by vigorously stirring for one hour. Then 0.5 gram of the American Cyanamid 2246 anti-oxidant was added as an antioxidant followed by mixing for 5 minutes. The reaction mixture was then steam stripped, washed, and filtered, as in Example 1. However, in place of using vacuum drying as in Example 1, instead an eight-inch 2-roll heated polymer mill operating at a temperature of about 240° F. was used to roll dry the polymer product. 247.9 grams of final product was obtained having about 81.47 wt. % carbon, 13.79 wt. % hydrogen, 0.61 wt. % sulfur and 0.42 wt. % magnesium.

Sludge Inhibition Bench (SIB) Test

The efficacy of the derivatized copolymers of this invention as dispersants in lubricating oil is illustrated in a Sludge Inhibition Bench (SIB) Test. The SIB Test has been found, after a large number of evaluations, to be an excellent test for assessing the dispersing power of lubricating oil dispersant additives.

The medium chosen for the SIB Test was a used crankcase mineral lubricating oil composition having an original viscosity of about 325 SUS at 38° C. that had been used in a taxicab that was driven generally for short trips only, thereby causing a buildup of a high concentration of sludge precursors. The oil that was used contained only a refined base mineral lubricating oil, a viscosity index improver, a pour point depressant and zinc dialkyldithiophosphate anti-wear additive. The oil contained no sludge dispersant. A quantity of such used oil was acquired by draining and refilling the taxicab crankcase at 1000–2000 mile intervals.

The Sludge Inhibition Bench Test is conducted in the following manner: The aforesaid used crankcase oil, which is milky brown in color, is freed of sludge by centrifuging for one hour at about 39,000 gravities (gs). The resulting clear bright red supernatant oil is then decanted from the insoluble sludge particles thereby separated out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil, a small amount, such as 0.5, 1 or 2 weight percent, on an active ingredient basis, of the particular additive being tested. Ten grams of each blend being tested are placed in a stainless steel centrifuge tube and are heated at 138° C. for 16 hours in the presence of air. Following the heating, the tube containing the oil being tested is cooled and then centrifuged for about 30 minutes at room temperature at about 39,000 gs. Any deposits of new sludge that form in this step are separated from the oil by decanting the supernatant oil and then carefully washing the sludge deposits with 25 ml of heptane to remove all remaining oil from the sludge and further centrifuging. The weight of the new solid sludge that has been formed in the test, in milligrams, is determined by drying the residue and weighing it. The results are reported by comparison with a blank not containing any additional additive. The less new sludge precipitated in the presence of the additive, the larger the percent sludge that is dispersed, and the more effective is the additive as a sludge dispersant. In other words, if the additive is effective, it will hold at least a portion of the new sludge that forms on heating and oxidation stably suspended in the oil so it does not precipitate down during the centrifuging. Using the above test, the sludge dispersant activities of the preceding metal neutralized sulfonates are shown in the following Table at an active ingredient (a.i.) levels in the oil of 0.05 grams per 10 grams of oil and at 0.025 grams active ingredient per 10 grams of oil.

For comparison two commercial dispersants were also tested. One was an ashless dispersant which was a polyisobutenyl succinimide of polyethyleneamine (PIBSA-PAM) while the other was a multifunctional V.I.-dispersant which was a copolymer of styrene and maleic anhydride neutralized with a mixture of alcohol and amine as described in U.S. Pat. No. 3,702,300.

TABLE I

| | SLUDGE INHIBITION BENCH TEST | | |
|---|---|---|---|
| | | % Sludge Suspended | |
| Example | Composition | .05g/10g. | .025g/10g |
| Blank | Test oil only | 0 | 0 |
| 1B | Mg Sulfonated EPDM | 21.0 | 4.8 |
| 1C | Na Sulfonated EPDM | 11.4 | 9.8 |
| 2 | Mg Sulfonated EPDM | 43.7 | 22.8 |
| PIBSA-PAM dispersant | — | 54.5 | 23.0 |
| Commercial V.I. dispersant | — | 56.0 | |

As seen by Table I, Examples 1 and 2 show that the metal neutralized sulfonated polymers had sludge dispersing activity. The magnesium salt of Example 1B was more effective than the sodium salt of Example 1C, even though the identical polymer with the same number of sulfonic acid groups was used, thus indicating a superiority and preference for the multivalent metals, such as the alkaline earth metals. Example 2 used polymers with a higher level of sulfonation (22 milliequivalents per 100 grams of polymer) which increased the dispersancy effect relative to the corresponding magnesium salt of Example 1C which has a sulfonate level of 18.3 milliequivalents per 100 grams of polymer. Example 2 had a dispersant effect about comparable to the two commercial products used in this bench test.

EXAMPLE 3

An EPDM dissolved in hexane was sulfonated with acetyl sulfate to a 0.015 millimole $SO_3$/100 g polymer and then neutralized with zinc acetate, in a manner similar to that described above with regard to Examples 1 and 2. The sulfonate neutralized with zinc acetate was precipitated with isopropanol, filtered, washed twice with water, then twice with isopropanol and dried in a vacuum oven.

54.23 grams of product was obtained which analyzed about 0.71 wt. % zinc and 0.50 wt. % sulfur.

The EPDM had a Mooney ML at 100° C. of 19.5, and consisted of about 56.2 wt. % ethylene, about 3.2 wt. % 5-ethylidene-2-norbornene and about 40.6 wt. % propylene, said terpolymer having an unsaturation of about 26.7 meq/100 g of polymer.

EXAMPLE 4

An EPDM terpolymer with 0.04062 mole of C=C unsaturation was used in this example which was a terpolymer of about 45.6 wt. % ethylene, 1.2 wt. % of 5-ethylidene norborene and about 53.2 wt. % propylene, having an unsaturation equivalent to 10.0 meq/100 grams and a Mooney viscosity ML at 100° C. of 20.5. 400 grams of this polymer was dissolved in 4000 ml of hexane and then sulfonated with 12.55 grams of acetyl sulfate solution, made from 7.76 g (0.0760 m) acetic anhydride with 4.79 (0.0475 mole) of $H_2SO_4$, which was added dropwise over a period of about 10 minutes with stirring. Stirring was continued for about 2½ hours, then 100 ml of isopropyl alcohol was added followed by stirring for 15 minutes. Next, a solution consisting of 18.9 grams of magnesium acetate dissolved in 85 ml of distilled water was added over about 5 minutes with stirring. After about another 15 minutes of stirring, 50 ml of isopropyl alcohol was added. Heat was turned on so that after about another hour and 50 minutes the temperature had risen from ambient (29° C.) to 60° C., whereupon the heat was turned off and the material was filtered, washed and dried. 361.02 grams of dried material was obtained.

Varnish Inhibition Bench Test (VIB)

Each test sample consisted of 10 grams of lubricating oil and 0.01 g. of the metal neutralized sulfonated polymer. The test oil to which the additive is admixed was a commercial lubricating oil obtained from a taxi after about 2,000 miles of driving with said lubricating oil. Each ten gram sample was heat soaked overnight at about 140° C. and thereafter centrifuged to remove the sludge. The supernatant fluid of each sample was subjected to heat cycling from about 150° C. to room temperature over a period of 3.5 hours at a frequency of about 2 cycles per minute. During the heating phase, gas which was a mixture of about 0.7 volume percent $SO_2$, 1.4 volume percent NO and balance air was bubbled through the test samples. During the cooling phase water vapor was bubbled through the test samples. At the end of the test period, which testing cycle can be repeated as necessary to determine the inhibiting effect of any additive, the wall surfaces of the test flasks in which the samples were contained are visually evaluated as to the varnish inhibition. The amount of varnish imposed on the walls is rated to values of from 1 to 11 with the higher number being the greater amount of varnish, in comparison with a blank with no additive that was rated 11.

Sulfonated polymer of Examples 3 and 4 were tested, along with a blank with no dispersant. The materials were also tested in the SIB test previously described,

TABLE II

| | 0.01g/10g | |
|---|---|---|
| Material | SIB | VIB |
| Blank (no dispersant) | 10 | 11 |
| Example 3 | 5.8 | 7 |
| Example 4 | 2.6 | 9 |

As seen by Table II, the materials of Examples 3 and 4 gave both sludge dispersancy and varnish inhibition activity in the SIB and VIB tests. Here, the SIB ratings were on a basis of the amount of sludge that precipitated during centrifuging relative to the blank rating of 10. To illustrate, Example 3 material allowed the precipitation of only 58% of the sludge that precipitated with no additive (i.e. the Blank). As a result, low numbers indicate increased effectiveness in the above SIB and VIB tests.

EXAMPLE 5

This examples illustrates the viscosity effects in oil of the polymer upon sulfonation and neutralization. Thus, following the general procedure of Example 4, the masticated V-2504 terpolymer of Example 1 was sulfonated with acetyl sulfate to 22 milliequivalents of $SO_3/100$ grams of polymer and then neutralized with magnesium acetate. This material was dissolved in mineral lubricating oil base stock using a concentration of 1.5828 grams (of which 1.5537 grams is the weight of the hydrocarbon polymer and 0.0291 grams is the weight added by the magnesium and sulfonate groups) of the magnesium neutralized sulfonate polymer per 100 ml of solution. A comparison solution containing 1.5537 grams of the terpolymer per se in 100 ml of oil solution. The viscosities of the two solutions along with the base oil per se, were compared over a temperature range of 10° to 210° F. which are summarized in the following Table III.

TABLE III

| Composition | Viscosity, Cs, at °F. | | | | | | |
|---|---|---|---|---|---|---|---|
| | 210 | 150 | 100 | 68 | 32 | 20 | 10 |
| Mg SO₃ Polymer | 65.61 | 190.3 | 562.6 | 1673 | 8364 | 9948 | 21407 |
| Polymer before sulfonation | 18.09 | 45.25 | 137.3 | 363.5 | 1554 | 2786 | 4696 |
| Lubricating Oil | 5.08 | 11.46 | 31.45 | 77.88 | 304.3 | 532.6 | 886.4 |

The preceding Table III shows the viscosity effects of sulfonation and magnesium neutralization, namely the effect of the 0.0291 grams of metal and sulfonic acid moieties per 100 grams of the oil solution.

EXAMPLE 6

EPDM terpolymer containing about 43 wt. % ethylene, about 3 wt. % of 5-ethylidene-2-norbornene with the balance propylene, having a Mooney viscosity (ML, 1+8, 212° F.) of 7 was sulfonated to 20 milliequivalents of (meq.) sulfonic acid and neutralized with magnesium in a molar amount equal to the molar amount of sulfonic acid groups.

A fully formulated crankcase lubricating motor oil composition was prepared containing 1.1 wt. % of the neutralized sulfonated polymer; about 88.64 wt. % of Solvent 150 neutral mineral lubricating oil; 3.31 wt. % of a Solvent 330 neutral mineral lubricating oil; 1.69 wt. % of nonylphenol sulfide (about 85 wt. % active ingredient in 15 wt. % mineral oil) as antioxidant; 0.20 wt. % of 45 wt. % concentrate of a dialkyl fumarate-vinyl acetate copolymer pour point depressant; 1.83 wt. % of a zinc dialkyl dithiophosphate concentrate containing about 75 weight percent active ingredient in diluent mineral oil formed by reacting $P_2S_5$ with a mixture of about 65 wt. % isobutyl alcohol and about 35 wt. % of amyl alcohol and then neutralizing with zinc oxide; 2.16 wt. % of a 50 wt. % active ingredient concentrate of an ashless dispersant mixture of a polyisobutenyl succinic anhydride reacted with polyethyleneamine and then borated, together with a polyisobutenyl succinic anhydride reacted with tris-hydroxymethyl aminomethane, as described in U.S. Pat. No. 4,113,639; and 1.07 wt. % of a 400 TBN (Total Base Number) $CO_2$ overbased magnesium alkylaryl sulfonate containing about 9.2 weight percent magnesium, as an antirust material. The above formulation containing the sulfonated EPDM were compared with the formulation containing 1.1 weight percent of the unsulfonated EPDM terpolymer, and an identical formulation but containing instead one weight percent of a commercial ethylene-propylene copolymer viscosity index improver (EP-VI) with 88.74 wt. % of the Solvent 150 neutral oil. The specific compositions were then tested for their viscometric properties, namely kinematic viscosity at 210° F. in Centistokes, and under the high shear Cold Cranking Simulator (CCS) according to ASTM-D-2607-72 method at 0° C. for viscosity in centipoises, as well as being tested for ASTM pour point and ASTM sonic shear breakdown. The results obtained are summarized in the following Table.

TABLE IV

EFFECT OF SULFONATION LEVEL ON VISCOMETRICS (FORMULATED OIL)

|  | EPDM Polymer |  | EP-VI Polymer |
| --- | --- | --- | --- |
| Sulfonation Level, meq. | 0 | 20 | 0 |
| Counterion | — | Magnesium | — |
| Kv @ 210° F., cS | 11.70 | 15.8 | 15.87 |
| CCS @ 0° F., cP | 2500 | 2350 | 2840 |
| POUR POINT, °F. | −35 | −35 | −30 |
| % SONIC SHEAR BREAKDOWN | 16.2 | 29 | 28 |
| WT. % POLYMER IN FORMULATION | 1.1 | 1.1 | 1.0 |

As seen by Table IV, sulfonation and neutralization has little effect upon the 0° F. viscosity of the polymer, but has a large effect on increasing viscosity at 210° F. It is very desirable to have this low temperature viscometric advantage since the low temperature low viscosity facilitates cold cranking and start up of the engine in cold weather, while the higher 210° F. viscosity is desired in order to facilitate lubrication and minimize oil use during engine operation, and the greater this effect, the wider the cross grading of oils that can be obtained, e.g. 10W-40, 10W-50 or even wider. It is seen that the sulfonated polymer was superior to the commercial ethylene propylene V.I. improver in that it had better low temperature viscosity when formulated to the same 210° F. viscosity level. Thus, the 20 meq. sulfonated and magnesium neutralized polymer gave a viscosity of 2350 cP at 0° C. in the Cold Cranking Simulator as compared to the higher viscosity of 2840 cP for the EP-VI, even though the 210° F. viscosities for both formulations were nearly identical. The pour point of the sulfonated polymer formulation was also good. Sulfonated polymers, e.g. EPDM, with about 25 to about 55 wt. % ethylene are particularly preferred for use in oils requiring poor depressant, since higher ethylene contents above about 55 wt. % ethylene tend to cause the ethylene copolymer, e.g. EPDM, to adversely interact with many conventional pour point depressants and/or the wax, e.g. see U.S. Pat. No. 3,691,078.

What is claimed is:
1. A composition comprising
   a major amount of a lubricating oil or a liquid petroleum fuel; and
   a hydrocarbon soluble ethylene-containing ionic polymer useful as a V.I.-dispersant additive, having a number average molecular weight in the range of about 5000 to 1,000,000, substantially free of polar cosolvent, formed by sulfonating an aliphatic olefin polymer comprising about 30 to 84.5 mole % ethylene, about 15 to 69.5 mole % $C_3$ to $C_{18}$ alpha olefin and about 0.5 to 20 mole % of $C_5$ to $C_{14}$ diolefin, with a non-chlorine-containing sulfonating agent, to form sulfonic acid groups, said sulfonated polymer being at least partly neutralized with a metal compound wherein said metal is selected from the group consisting of multivalent metals,
   wherein when said composition comprises a major amount of said lubricating oil, said composition contains 0.01 to 10 wt. % of said ionic polymer; and wherein when said composition comprises a major amount of said fuel, said composition contains 0.001 to 0.5 wt. % of said ionic polymer.
2. A composition according to claim 1 wherein said olefin polymer has been sulfonated to a level of about 1 to 60 milliequivalents of $SO_3H$ groups per 100 grams of sulfonated polymer.
3. A composition according to claim 1, wherein said polymer has a number average molecular weight in the range of about 10,000 to 200,000 and is sulfonated to contain a sulfur content of 0.03 to 1.44 wt. % sulfur, and wherein at least 25 mole % of the sulfonic acid units are neutralized with said metal compound.
4. A composition according to claim 3, wherein said sulfonated polymer is 50 to 100% neutralized with metal carboxylate.
5. A composition according to claim 3, wherein said sulfonated polymer is 50 to 100% neutralized with a magnesium, or zinc, carboxylate of a $C_1$ to $C_{18}$ fatty acid.
6. A composition according to claim 3, wherein said composition comprises a major amount of lubricating oil, and about 0.01 to 10 wt. % of said ionic polymer.
7. A composition according to claim 6, wherein said ionic polymer is formed from an elastomeric polymer having a number average molecular weight in the range of about 15,000 to 100,000.
8. A composition according to claim 7, wherein said ionic polymer is a sulfonated ethylene-propylene-diene monomer terpolymer having about 1 to 60 milliequivalents of sulfonate groups per 100 grams of polymer.
9. A composition according to claim 8, wherein said sulfonated polymer is neutralized with an alkaline earth metal compound.
10. A composition according to claim 9, wherein said metal compound is magnesium acetate.
11. A composition according to claim 8, wherein said metal compound is zinc acetate.
12. A process for improving the viscosity and dispersant properties of a lubricant which comprises the step of adding a V.I. improver-dispersant ionic polymer to said lubricant at a concentration level of about 0.01 to about 10 weight %, based on the weight of the total composition, said ionic polymer being formed by sulfonating an oil-soluble ethylene olefin polymer comprising about 30 to 84.5 mole % ethylene, about 15 to 69.5 mole % $C_3$ to $C_{18}$ alpha olefin and about 0.5 to 20 mole % of $C_5$ to $C_{14}$ diolefin, having a number average molecular weight in the range of 10,000 to 500,000 with a non-chlorine-containing sulfonating agent, said polymer being neutralized with a metal compound wherein said metal is selected from the group consisting of multivalent metals, and said ionic polymer being free of polar alcohol or amine cosolvent.
13. A process according to claim 12 wherein said ionic polymer contains about 1 to 60 milliequivalents of sulfonic acid groups per 100 grams of polymer, and wherein said ethylene olefin polymer has a number average molecular weight in the range of about 10,000 to 200,000.

14. A process according to claim 12 wherein said ethylene olefin polymer comprises about 40 to 70 mole % ethylene, about 20 to 58 mole % of $C_3$ to $C_{18}$ olefin and about 2 to 10 mole % of $C_5$ to $C_{14}$ diolefin wherein at least 25 mole % of the sulfonic acid units are neutralized with said metal compound to form said ionic polymer containing about 0.03 to 1.92 wt. % sulfur and about 0.007 to 6.00 wt. % metal.

15. A process according to claim 14, wherein said sulfonated polymer is 50 to 100% neutralized with said metal compound, and wherein said metal compound is an alkaline earth metal carboxylate.

16. A process for preparing a viscosity index improving-dispersant ionic sulfonated polymer as a lubricating oil additive which comprises dissolving polymer comprising about 30 to 84.5 mole % ethylene, about 15 to 69.5 mole % $C_3$ to $C_{18}$ alpha olefin and about 0.5 to 20 mole % of $C_5$ to $C_{14}$ diolefin, said polymer having a molecular weight in the range of about 5,000 to 1,000,000 in a mineral lubricating oil as solvent to form an oil solution, sulfonating said polymer with a non-chlorine-containing sulfonating agent in said oil solution to introduce sulfonic acid groups, and then neutralizing at least 25% of the sulfonic acid groups of said sulfonated polymer in said oil solution with a metal neutralizing agent.

17. An additive concentrate comprising diluent oil, and in the range of about 5 to 45 wt. % of a hydrocarbon soluble V.I. improving-dispersant ionic polymer having a number average molecular weight in the range of 5000 to 1,000,000 formed by sulfonating an aliphatic olefin polymer comprising about 30 to 84.5 mole % ethylene, about 15 to 69.5 mole % $C_3$ to $C_{18}$ alpha olefin and about 0.5 to 20 mole % of $C_5$ to $C_{14}$ diolefin, with a non-chlorine-containing sulfonating agent, said sulfonate polymer being at least partly neutralized with a metal compound wherein said metal is selected from the group consisting of multivalent metals, and substantially free of amine or alcohol cosolvent and a dissolving aid selected from the group consisting of alkyl phenol sulfide lubricating oil antioxidants and lubricating oil ashless dispersants.

18. A fuel oil composition comprising a major amount of normally liquid petroleum fuel oil and 0.001 to 0.5 wt. % of a hydrocarbon soluble polymer which is ionic and has V.I. improving-dispersant properties, said polymer having a number average molecular weight in the range of about 5000 to 1,000,000, formed by sulfonating an ethylene containing polymer comprising about 30 to 84.5 mole % ethylene, about 15 to 69.5 mole % $C_3$ to $C_{18}$ alpha olefin and about 0.5 to 20 mole % of $C_5$ to $C_{14}$ diolefin, with a non-chlorine-containing-sulfonating agent to form sulfonic acid groups, said resulting sulfonated polymer being at least partly neutralized with a metal compound wherein said metal is selected from the group consisting of multivalent metals, lithium and potassium.

19. A crankcase motor oil composition comprising a major amount of mineral lubricating oil, zinc dialkyl dithiophosphate, overbased metal alkylaryl sulfonate, a lubricating oil ashless dispersant, and about 0.1 to 10 wt. % of a hydrocarbon soluble V.I. improving dispersant ionic sulfonated ethylene polymer comprising about 30 to 84.5 mole % ethylene, about 15 to 69.5 mole % $C_3$ to $C_{18}$ alpha olefin and about 0.5 to 20 mole % of $C_5$ to $C_{14}$ diolefin, having a number average molecular weight in the range of about 5000 to 1,000,000, formed by sulfonating said ethylene containing polymer with a non-chlorine-containing sulfonating agent to form sulfonic acid groups, said resulting sulfonated polymer being at least partly neutralized with a metal compound.

20. An oil composition according to claim 19, wherein said sulfonated polymer is at least partly neutralized in situ in said oil by reaction with metal from said dithiophosphate or sulfonate.

21. An oil composition according to claim 19, which further includes oil soluble alkyl hydroxy aromatic sulfide as an antioxidant, and in at least a portion of said oil at least one of said sulfide or ashless dispersant is blended into the oil before said sulfonated polymer is added in order to facilitate dissolving said sulfonated polymer.

22. An oil composition according to claim 19, wherein said ethylene polymer consists essentially of about 40 to 70 mole % ethylene, about 20 to 58 mole % of $C_3$ to $C_{18}$ alpha olefin and about 2 to 10 mole % of $C_5$ to $C_{14}$ diolefin.

23. A method of operating an internal combustion automotive engine which comprises lubricating said engine with the composition of claim 19.

* * * * *